March 24, 1970 A. PITNER 3,501,928
UNIVERSAL JOINTS
Filed Oct. 24, 1967 2 Sheets-Sheet 1
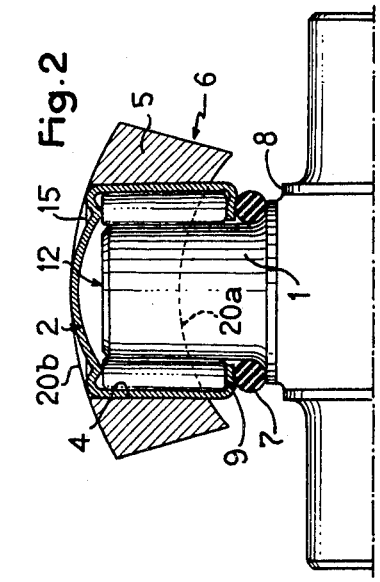
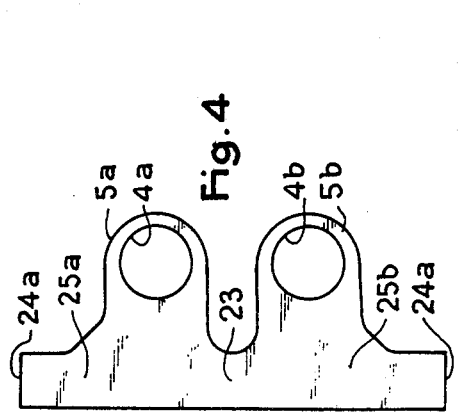
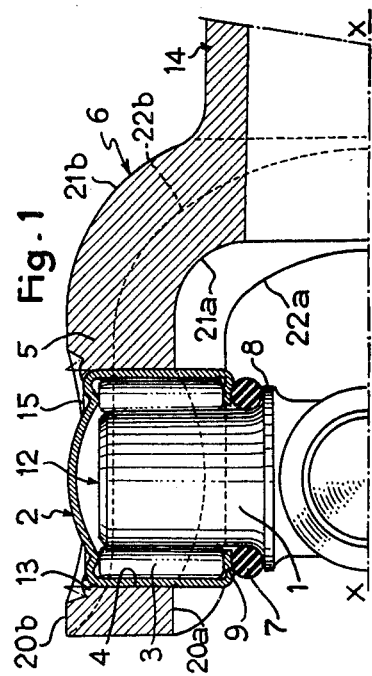
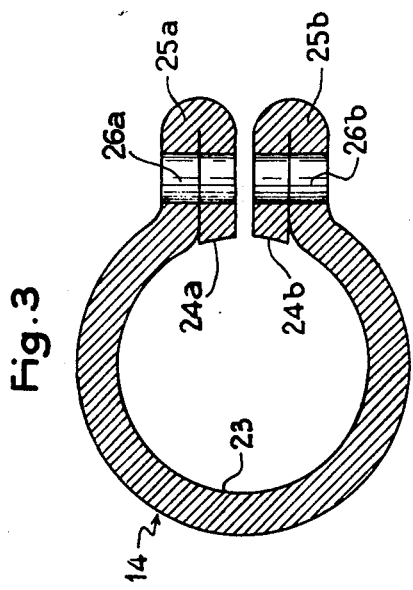

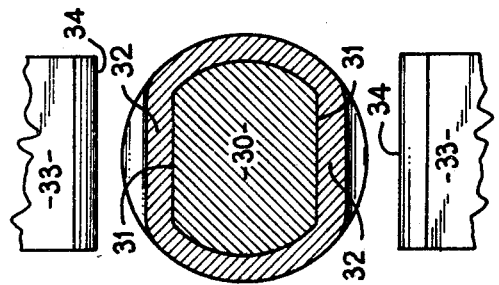
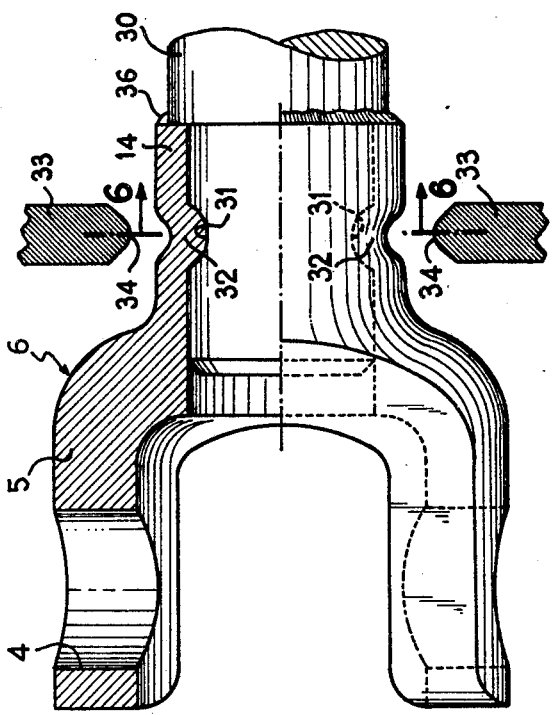

United States Patent Office 3,501,928
Patented Mar. 24, 1970

3,501,928
UNIVERSAL JOINTS
Alfred Pitner, Paris, France, assignor to Nadella S.A., Malmaison, France, a French corporation
Filed Oct. 24, 1967, Ser. No. 677,625
Claims priority, application France, Nov. 10, 1966, 83,342
Int. Cl. F16d 3/34
U.S. Cl. 64—17                11 Claims

ABSTRACT OF THE DISCLOSURE

A universal joint comprising two forks having a tubular hub adapted to be fixed to a shaft and a cross, the four journals of which are each capped by a needle-containing cup maintained in the bore of the corresponding fork, the forks being of a sheet of metal so shaped that, in the region of the bore, the section perpendicular to the axis of each fork branch has an inwardly-facing concavity.

---

The present invention relates to universal joints comprising two forks having a tubular hub for fixing on a shaft and a cross whose four journals are each capped by a needle-containing cup which is maintained in the bore of the corresponding fork.

The object of the invention is to reduce the cost of such a universal joint by providing forks which are lighter and simpler to manufacture than conventional forks.

More precisely, the object of the invention is to provide a universal joint wherein the forks are of a sheet of metal so shaped that, in the region of the bore, the section perpendicular to the axis of each fork branch has an inwardly-facing concavity.

The concave shape, obtained for example by a cylindrical or conical bending of the fork branches, affords on each side of the plane of symmetry of the fork the best position of support for the cups in the bores in the direction of the forces to be transmitted. Further, in the plane of symmetry, this shape affords inside, the best possible clearance for mounting the cross by a pivoting movement and, outside, a sufficient difference in level for producing under the best shaping conditions radial projections from the edge of the bores for axially retaining the cups if this is desired.

The bent branches of the forks are advantageously connected to the hub by portions whose surfaces have a toric or spherical shape. This imparts to the forks maximum stiffness against torsional stress.

The tubular hub is usually a continuous tube. In this case, a simple means for rigidly connecting the hub to the corresponding shaft consists in a local crushing of the wall of the tube by a radial upsetting of the material into one or more indentations formed on the periphery of the shaft, for example tangential recesses. This connection usually completes the conventional manner of fixing by means of welding or splines and affords—particularly in the case of welding liable to break—an additional security the advantage of which is particularly appreciable in elements such as transmission shafts employed in the steering of automobile vehicles which must be protected against any failure.

According to another feature of the invention, the tubular hub can be in the form of a split tube produced by rolling sheet of metal and folding marginal portions thereof so as to form two ears for a screw-and-nut clamping.

Further features and advantages of the invention will be apparent from the ensuing description with reference to the accompanying drawing.

In the drawing:
FIG. 1 is a partial axial sectional view of a universal joint in the plane of symmetry of the fork;

FIG. 2 is a partial sectional view of the universal joint in the plane of symmetry of the cross;
FIG. 3 is a cross-sectional view of the hub constructed by folding and rolling operation;
FIG. 4 is a blank of a metal sheet from which a fork provided with the hub shown in FIG. 3 is obtained;
FIG. 5 is an axial sectional view of means for interconnecting the hub shown in FIG. 1 and the corresponding shafts; and
FIG. 6 is a cross-sectional view taken along line 6—6 of FIG. 5.

The journals 1 are capped by a cup 2 which contains needles 3 and is fitted in a bore 4 in the branch 5 of the fork 6. A seal is afforded by a round-section ring 7 of elastomer clamped between a flange 8 on the journal and a radial edge 9 formed at the free end of the cup.

The branches 5 and hub 14 of the fork 6 are constructed from a single plane sheet of metal. The part of the latter corresponding to the branches 5 is cylindrically bent so as to form in the region of the bore 4 of each branch an inwardly-facing concavity 20a in a plane perpendicular to the axis X—X of the fork.

This substantially part-circular shape affords in the median part of the fork 5 a wide passage for mounting the cross by a tilting movement permitted by the distance between the end faces 12 of the journals and the diameter of the flanges 8. Further, on either side of the cup 2, in the plane of symmetry of the cross, that is, in the direction of the applied forces, the cup 2 is supported in the bore 4 by bearing faces substantially in alignment with the needles.

The outer face 20b (FIG. 1) of the branch 5 is at a distance substantially greater from the axis X—X than the edge 15 of the end wall of the cup 2. This facilitates the production of a local deformation constituting a radial projection 13 in the bore 4 for axially retaining the cup 2.

The toric faces, namely the inner face 21a and outer face 21b, provided between the branches 5 and the hub 14 and defined by edges 22a and 22b respectively afford maximum stiffness against forces applied in the plane of symmetry of the cross substantially in the region of the centre of gravity of the surface of the journals 1.

The hub 14 shown in FIG. 1 can be constructed by press-forming the aforementioned plane sheet of metal by means of a punch acting along the axis X—X which imparts thereto, as shown, a thickness which is less than that of the branches 5. On the other hand, the hub 14 shown in FIG. 3 is in the form of a sheet metal split collar having a part-cylindrical inner face 23, constructed by rolling a sheet metal blank A (FIG. 4) and two faces 24a and 24b constituted by the edges of said sheet metal blank which has been folded onto itself so as to form two flange portions constituting ears 25a, 25b in the course of an operation which was carried out before rolling the portion 23. Two aligned apertures 26a, 26b are provided for mounting a screw and a nut which, after a final forming operation, for example the provision of splines on the rough bore constituted by the faces 23, 24a and 24b, permit the clamping of the inner face of the hub on a corresponding splined shaft so as to ensure a good contact between the splined portions and prevent axial displacement of the hub.

The sheet of metal A also comprises tabs 5a, 5b which are provided, if desired, with apertures 4a and 4b and intended to form the two branches 5 of the complete fork. It will be understood that the bores 4 corresponding to the apertures 4a, 4b must be machine finished before the cups 2 are placed in position.

FIG. 5 shows diagrammatically how the hub 14 shown in FIG. 1, which has the shape of a continuous tube, can be fixed to the corresponding shaft 30. The latter comprises two diametrically opposed tangential recesses 31 into which the cylindrical wall 32 of the hub 14 has been radially upset by means of two tools 33 whose straight working edges 34 are tangential to the hub 14. A weld 36, which can be continuous or discontinuous, can be made in the conventional manner at the free end of the hub 14 so as to provide a further connection to the shaft 30.

Although a specific embodiment of the invention has been described, many modifications and changes may be made therein without departing from the scope of the invention.

Having now described my invention what I claim as new and desire to secure by Letters Patent is:

1. In an assembly for a universal joint comprising a fork having branches and a tubular hub for fixing the fork to a shaft, a cross having journals in one piece and needle-containing cups engaged on the journals, each cup being engaged in a bore in a corresponding branch of the fork; the fork comprising a sheet of metal so shaped that in a region of the bore in each branch of the fork a section perpendicular to the axis of the fork has an inwardly facing concavity.

2. An assembly as claimed in claim 1, wherein each branch of the fork has in the region of the bore a substantially cylindrical shape.

3. An assembly as claimed in claim 1, wherein each branch of the fork has in the region of the bore a substantially conical shape.

4. An assembly as claimed in claim 1, wherein portions having faces having a toric shape connect the branches to the hub.

5. An assembly as claimed in claim 1, wherein portions having outer faces having substantially the shape of a portion of a sphere coaxial with said hub connect the branches to the hub.

6. An assembly as claimed in claim 1, wherein said sheet of metal is bent in the shape of a sheet metal split collar constituting said hub and having two axially extending sheet metal flange portions constituting ear portions which define the split and can be clamped together for fixing the fork on the corresponding shaft, and two axially extending sheet metal tab portions constituting said branches of the fork.

7. An assembly as claimed in claim 6, wherein each ear portion has a double thickness relative to the rest of the hub owing to the folding of the sheet metal flanges onto themselves.

8. In an assembly for a universal joint comprising a shaft, a fork having a tubular hub mounted on said shaft, a cross having journals in one piece and needle-containing cups engaged on the journals, each cup being engaged in a bore in the corresponding branch of the works; the feature that the fork is of a sheet of metal so shaped that in the region of the bore in each branch of the fork the section perpendicular to the axis of the branch has an inwardly facing concavity, the shaft having depression means and the hub having local deformation means engaging the depression means in the shaft so as to fix the hub to the shaft solely in a single transverse plane.

9. An assembly as claimed in claim 8, wherein the shaft comprises two diametrically opposite parallel tangential grooves, each groove forming a depression means and the hub is deformed when positioned on the shaft by a radially directed press tool applied to the hub with the leading edge of the tool in line with a groove.

10. In an assembly for a universal joint comprising a fork having branches and a tubular hub for fixing the fork to a shaft, means defining a cross having journals and needle-containing cups engaged on the journals, each cup being engaged in a bore in a corresponding branch of the fork and the cross being held centered on the axis of the fork solely by retaining means retaining the cups against movement out of the corresponding bores radially of the axis of the fork; the fork comprising a sheet of metal so shaped that in a region of the bore in each branch of the fork a section of the branch perpendicular to the axis of the fork is arcuate with an inwardly facing concavity.

11. An assembly as claimed in claim 10, wherein said retaining means comprise a deformed portion of the branch in an axial plane of the fork containing the axis of the corresponding bore.

References Cited

UNITED STATES PATENTS

| | | | |
|---|---|---|---|
| 1,389,422 | 8/1921 | Curtis | 64—17 |
| 2,904,975 | 9/1959 | Miller | 64—17 |
| 1,812,934 | 7/1931 | Curtis | 64—17 |
| 1,823,158 | 9/1931 | Mogford et al. | 287—109 |
| 2,278,698 | 4/1942 | Green | 287—53 |

FOREIGN PATENTS

| | | |
|---|---|---|
| 338,968 | 12/1930 | Great Britain. |
| 1,001,170 | 8/1965 | Great Britain. |

MILTON KAUFMAN, Primary Examiner

UNITED STATES PATENT OFFICE
CERTIFICATE OF CORRECTION

Patent No. 3,501,928　　　　　　　　Dated March 24, 1970

Inventor(s) Alfred Pitner

It is certified that error appears in the above-identified patent and that said Letters Patent are hereby corrected as shown below:

In the heading, column 1, line 3, --of one-half interest-- should be inserted after "assignor". line 4, "Malmaison" should read -- Rueil-Malmaison --.

SIGNED AND SEALED

OCT 27 1970

(SEAL)
Attest:

Edward M. Fletcher, Jr.
Attesting Officer

WILLIAM E. SCHUYLER, JR.
Commissioner of Patents